(12) United States Patent
Hwang et al.

(10) Patent No.: US 9,392,447 B2
(45) Date of Patent: Jul. 12, 2016

(54) SECURITY HANDLING FOR MULTI FREQUENCY BAND

(71) Applicant: NOKIA SOLUTIONS AND NETWORKS OY, Espoo (FI)

(72) Inventors: Woonhee Hwang, Espoo (FI); Eric Drury, Lake Zurich, IL (US); Guenther Horn, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 359 days.

(21) Appl. No.: 14/162,058

(22) Filed: Jan. 23, 2014

(65) Prior Publication Data

US 2014/0302821 A1    Oct. 9, 2014

Related U.S. Application Data

(60) Provisional application No. 61/808,730, filed on Apr. 5, 2013.

(51) Int. Cl.
| | |
|---|---|
| *H04M 1/66* | (2006.01) |
| *H04W 12/04* | (2009.01) |
| *H04L 5/00* | (2006.01) |
| *H04W 36/00* | (2009.01) |

(52) U.S. Cl.
CPC ............. *H04W 12/04* (2013.01); *H04L 5/003* (2013.01); *H04L 5/0092* (2013.01); *H04W 36/0055* (2013.01)

(58) Field of Classification Search
CPC . H04W 48/18; H04W 12/06; H04M 1/72519; H04L 9/12
USPC ............... 455/411, 550.1, 435.3; 380/272
See application file for complete search history.

(56) References Cited

U.S. PATENT DOCUMENTS

| | | | |
|---|---|---|---|
| 8,995,330 B2* | 3/2015 | Morioka | H04B 7/155 370/315 |
| 2007/0038734 A1* | 2/2007 | Grammel | H04L 45/12 709/223 |

(Continued)

OTHER PUBLICATIONS

3GPP TS 36.331 V11.3.0 (Mar. 2013); 3rd Generation Partnership Project; Technical Specification Group Radio Access Network; Evolved Universal Terrestrial Radio Access (E-UTRA); Radio Resource Control (RRC); Protocol specification (Release 11), 344 pages.

(Continued)

*Primary Examiner* — Danh Le

(74) *Attorney, Agent, or Firm* — Squire Patton Boggs (US) LLP

(57) ABSTRACT

Systems, methods, apparatuses, and computer program products for security handling in, for example, cells that support multiple frequency band indication are provided. One method includes receiving, for example by a source evolved node B (eNB) configured to communicate with a user equipment, a multiple frequency band indicator (MFBI) list, the multiple frequency band indicator (MFBI) list comprising at least one frequency band number listed in the same order of priority as broadcast by a target eNB. The method may further include selecting one of the at least one frequency band number for use by the source eNB, calculating a security key (KeNB*) using the DL EARFCN belonging to the selected frequency band number with the highest priority that is also supported by the user equipment, and signaling the calculated security key to the target eNB.

16 Claims, 3 Drawing Sheets

(56) References Cited

U.S. PATENT DOCUMENTS

| | | | | |
|---|---|---|---|---|
| 2011/0314111 | A1* | 12/2011 | Wang | G06Q 10/10 709/206 |
| 2013/0083773 | A1* | 4/2013 | Watfa | H04W 36/0033 370/331 |
| 2013/0100929 | A1* | 4/2013 | Liu | H04W 36/00 370/331 |
| 2013/0163504 | A1* | 6/2013 | Jia | H04W 60/00 370/315 |
| 2014/0254523 | A1* | 9/2014 | Chai | H04W 76/02 370/329 |
| 2014/0348129 | A1* | 11/2014 | Yang | H04W 36/0016 370/331 |
| 2015/0016413 | A1* | 1/2015 | Sirotkin | H04L 5/0057 370/331 |
| 2015/0127733 | A1* | 5/2015 | Ding | H04W 4/08 709/204 |

OTHER PUBLICATIONS

3GPP TS 36.331 V10.9.0 (Mar. 2013); 3rd Generation Partnership Project; Technical Specification Group Radio Access Network; Evolved Universal Terrestrial Radio Access (E-UTRA); Radio Resource Control (RRC); Protocol specification (Release 10), 307 pages.

3GPP TS 33.401 V12.7.0 (Mar. 2013); 3rd Generation Partnership Project; Technical Specification Group Services and System Aspects; 3GPP System Architecture Evolution (SAE); Security architecture (Release 12), 121 pages.

R2-132224; TSG RAN WG2; "LS on KeNB* generation in case of MFBI"; 3GPP TSG RAN WG2 Meeting #82; May 20-24, 2013 Fukuoka, Japan, 2 pages.

R2-132205; Nokia Siemens Networks; "Security key generation in case of MFBI"; 3GPP TSG-RAN2 Meeting #82; Fukuoka, Japan, May 20-24, 2013, 5 pages.

R2-131153; TSG RAN WG2; "[Draft] LS on KeNB* generation in case of MFBI"; 3GPP TSG RAN WG2 Meeting #81bis; Chicago, USA, Apr. 15-19, 2013, 2 pages.

R2-122764; Ericsson, ST-Ericsson; "Support of multiple frequency bands"; 3GPP TSG-RAN WG2 #78; Prague, Czech Republic, May 21-25, 2012, 3 pages.

R2-122009; RAN WG4; "LS on signalling of multiple frequency band indicators: prioritization of frequency bands Supported"; 3GPP TSG RAN WG2 Meeting #78; Prague, Czech Republic, May 21-25, 2012; R2-122009_R4-122225, 1 page.

International Search Report international application No. PCT/EP2014/051282 mailed Jun. 2, 2014.

* cited by examiner

SECURITY HANDLING FOR MULTI FREQUENCY BAND

CROSS-REFERENCE TO RELATED APPLICATIONS

This application claims priority to U.S. Provisional Application Ser. No. 61/808,730 filed on Apr. 5, 2013. The contents of this earlier filed application are hereby incorporated by reference in their entirety.

BACKGROUND

1. Field

Embodiments of the invention generally relate to wireless communications networks, such as the Universal Mobile Telecommunications System (UMTS) Terrestrial Radio Access Network (UTRAN) Long Term Evolution (LTE) and Evolved UTRAN (E-UTRAN).

2. Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE improves spectral efficiency in communication networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs. In addition, LTE is an all internet protocol (IP) based network, supporting both IPv4 and IPv6.

SUMMARY

One embodiment is directed to a method that includes receiving, by a source evolved node B (eNB) configured to communicate with a user equipment, a multiple frequency band indicator (MFBI) list. The multiple frequency band indicator (MFBI) list comprises at least one frequency band number listed in a same order of priority as a target cell broadcasts the downlink (DL) frequency bands in a system information block (SIB). The method may further include selecting one of the at least one frequency band number for use by the source eNB, calculating a security key (KeNB*) using a downlink (DL) evolved universal terrestrial radio access absolute radio frequency channel number (EARFCN) belonging to the selected one of the at least one frequency band number with the highest priority that is also supported by the user equipment, and signaling the calculated security key to the target eNB.

Another embodiment is directed to an apparatus including at least one processor and at least one memory comprising computer program code. The at least one memory and the computer program code may be configured, with the at least one processor, to cause the apparatus at least to receive a multiple frequency band indicator (MFBI) list. The multiple frequency band indicator (MFBI) list comprises at least one frequency band number listed in a same order of priority as a target eNB broadcasts DL frequency bands in a system information block (SIB). The at least one memory and the computer program code may also be configured, with the at least one processor, to cause the apparatus at least to select one of the at least one frequency band number for use by the apparatus, calculate a security key (KeNB*) using a downlink (DL) evolved universal terrestrial radio access absolute radio frequency channel number (EARFCN) belonging to the selected one of the at least one frequency band number with the highest priority that is also supported by a user equipment, and signal the calculated security key to the target eNB.

Another embodiment is directed to a computer program embodied on a computer readable medium. The computer program may be configured, when run a processor, to cause the processor to perform a process including receiving a multiple frequency band indicator (MFBI) list. The multiple frequency band indicator (MFBI) list comprises at least one frequency band number listed in a same order of priority as a target eNB broadcasts the downlink (DL) frequency bands in a system information block (SIB). The process may further include selecting one of the at least one frequency band number for use by the source eNB, calculating a security key (KeNB*) using a downlink (DL) evolved universal terrestrial radio access absolute radio frequency channel number (EARFCN) belonging to the selected one of the at least one frequency band number with the highest priority that is also supported by the user equipment, and signaling the calculated security key to the target eNB.

Another embodiment is directed to an apparatus including means for receiving, for example by a source evolved node B (eNB) configured to communicate with a user equipment, a multiple frequency band indicator (MFBI) list. The multiple frequency band indicator (MFBI) list comprises at least one frequency band number listed in a same order of priority as a target eNB broadcasts the downlink (DL) frequency bands in a system information block (SIB), The apparatus may further include means for selecting one of the at least one frequency band number for use by the source eNB, means for calculating a security key (KeNB*) using a downlink (DL) evolved universal terrestrial radio access absolute radio frequency channel number (EARFCN) belonging to the selected one of the at least one frequency band number with the highest priority that is also supported by the user equipment, and means for signaling the calculated security key to the target eNB.

BRIEF DESCRIPTION OF THE DRAWINGS

For proper understanding of the invention, reference should be made to the accompanying drawings, wherein.

DETAILED DESCRIPTION

Figure 1:
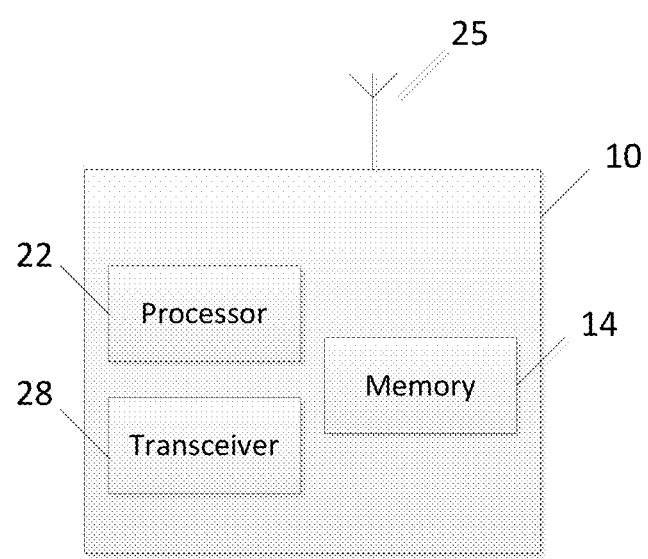
FIG. 1 illustrates an apparatus, according to one embodiment.

It will be readily understood that the components of the invention, as generally described and illustrated in the figures herein, may be arranged and designed in a wide variety of different configurations. Thus, the following detailed description of the embodiments of a system, a method, an apparatus, and a computer program product for security handling in, for example, cells that support multiple frequency band indication, as represented in the attached figures, is not intended to limit the scope of the invention but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As a release independent feature, 3GPP has defined signalling so that one cell can indicate that it belongs to multiple bands if the bands are overlapped. Certain embodiments of the present invention provide a solution for security during the handover between cells which support multiple frequency band indication.

The security key (KeNB) in the eNB and UE are generated with multiple inputs where the downlink (DL) frequency band number (i.e., EUTRA Absolute Radio Frequency Channel Number (EARFCN)) is one of the inputs. The KeNB* (i.e., key derived from KeNB) is calculated by the source eNB for the target cell and is forwarded to the target eNB during X2 handover (HO). For S1 handover, the target eNB computes the KeNB* locally from the fresh {next hop (NH), NH chaining counter (NCC)} pair received from the mobility management entity (MME) (see, e.g., 3GPP TS 33.401, clause 7.2.8.4.3). Therefore, in S1 handover, there is no dependency between the computation of the KeNB* and any knowledge of the source eNB about the frequency bands used in the target eNB.

The KeNB* for the other (alternate) cells in the target eNB are also calculated by the source eNB in case the UE should happen to perform a re-establishment into one of the alternate cells in the target eNB for the case where the intended handover is not successful. The KeNB* for each alternate cell is calculated by the source eNB for both X2 and S1 handovers. However, for S1 handover, the target eNB discards the multiple KeNB*s received from the source eNB, and derives the KeNB*s, as described in Annex A.5 of TS 33.401, based on the received fresh {NH, NCC} pair from the MME for forward security purpose (see, e.g., 3GPP TS 33.401, clause 7.4.3).

According to the current procedure, the target eNB can select any of the bands which both the target cell and UE support. This can create a key mismatch problem for X2 handover as the source eNB may not know which band will be selected by the target eNB. Also, for the re-establishment case, the target eNB cannot calculate the KeNB* for the alternate cells as it does not have all the required inputs (e.g., the KeNB currently in use at the source eNB) to calculate the KeNB*. This also can create a key mismatch problem for X2 handover if the source eNB does not use the same band as the UE will use when re-establishing into one of the alternate cells on the target eNB. Embodiments of the present invention provide solutions for at least these problems.

According to certain embodiments, assuming that the source eNB has knowledge that the target eNB supports multiple frequency bands, the source eNB provides assistance for the target eNB to select a specific frequency band overlapped with multiple bands which both the target cell and UE support.

An embodiment includes the source eNB deciding which band will be used at the target cell and informing the target eNB during the X2 HO. The source eNB may calculate the security key (KeNB*) according to band priority order, for the handover target cell as well as for each alternate cell for reestablishment. The source eNB decides which band will be used for security key (KeNB*) calculation and informs the target eNB, which in turn informs the UE. For handovers, both the eNB and the UE calculate security key KeNB* using the EARFCN in the legacy part of signaling of the target cell instead of the one from the Mobility Control Info. For re-establishment, the source eNB may provide KeNB*s calculated for all possible DL EARFCNs supported by each alternate cell under the target eNB. The source eNB provides the target eNB with the KeNB currently in use at the source eNB. This would allow the target eNB to choose the band to be used at the target cell and to calculate the associated KeNB* from the received KeNB, as well as calculate the KeNB* for the alternate cells in the case of re-establishment.

As a result, during the handover between cells with support of multiple (overlapped) frequency band indication, the behavior of both target and source eNBs handling security key KeNB* related issues are deterministic, that is, embodiments provide how both the target and source eNBs, with support of multiple frequency band indication, know exactly which specific frequency UE should be handed over. In particular, the source eNB provides information to the target eNB to determine which frequency bands to select for handover and the selected frequency band information is used to calculate the associated security key KeNB*, as well as calculate the KeNB* for the alternate cells in the case of re-establishment.

Multiple alternatives or options can be considered for implementing the above, according to certain embodiments. It is assumed that the source eNB knows that the target cell can broadcast multiple frequency bands. In addition, embodiments of the invention apply to X2 handovers, and, therefore, the description below addresses X2 handover.

In one embodiment, the source eNB is configured to decide which band will be used at the target cell and to inform the target eNB during the X2 HO. Then target eNB may then just follow the decision provided by the source eNB. For re-establishment, the source eNB may provide one or more KeNB* calculated for all possible DL EARFCNs supported by each alternate cell under the target eNB. In this embodiment, a new information element may be required in the RRC context or X2 layer to transfer the DL EARFCN decided by the source eNB to the target eNB, as well as the list of KeNB*s calculated for each of the alternate cells.

In a second embodiment, neighbor eNBs can exchange the multiple frequency band indicator (MFBI) information per cell, for example, during X2 setup or modification or X2 setup response. The bands in the MFBI list are in the same priority order as they are in the system information block (SIB) of the associated cell. Thus, the UE considers this order when it accesses the cell. The band in the legacy part of SIB1 signaling is not a part of the priority to the UE. However, in this case, the band in the legacy part should be the highest priority. Therefore, in this embodiment, a rule is implemented such that the target eNB always shall choose the band which is the highest priority and which is supported by the UE. According to this embodiment, the source eNB would also calculate KeNB* using the DL EARFCN of the band which has the highest priority which is also supported by the UE, including the band in the legacy part of SIB1 signaling. This embodiment would be used by the source eNB for calculating both the KeNB* for the handover target cell as well as the KeNB* for each alternate cell for re-establishment.

An advantage of this second embodiment is it does not conflict with the principle of "backwards key separation" (where the target node must not know the key used by the source node), and does not require any additional information elements (IEs) to be added to any X2, S1, or RRC messages. To implement this embodiment, future versions of 3GPP technical specifications are expected to be modified. For example, the specifications may be modified to describe the DL EARFCN selection in the case where the target cell is using MFBI. The specification may also be updated, for instance, to include some clarification to say that when MFBI is used in the target cell, the source eNB can calculate KeNB* using the DL EARFCN of the band in the legacy part of SIB1 signaling in the target cell specified by the DL EARFCN in the FDD (frequency division duplex) Info (for an FDD system) or the EARFCN in the TDD (time division duplex) Info (for a TDD system) included in the EUTRA-Mode-Info from the target cell via X2 message, if supported by the UE. Otherwise, the source eNB can calculate KeNB* using the DL EARFCN of the band with the highest priority in the MultibandInfoList of the target cell which the UE supports. Also, the target eNB may choose the DL EARFCN of the target cell in the same way.

In a third embodiment, the source eNB is configured to decide the frequency for KeNB* calculation and to inform the target eNB, which in turn informs the UE. The frequency for KeNB* calculation can be provided in addition to the EARFCN for HO. In this embodiment, a new information element may be required in the RRC container or X2 layer to transfer the DL EARFCN chosen by the source eNB to the target eNB. Additionally, in this embodiment, the RRCConnectionReconfiguration message for handover may be changed to include another DL EARFCN for KeNB* calculation in addition to the DL EARFCN for the HO target which is already defined. For re-establishment, the source eNB may provide the list of KeNB*s calculated for all possible DL EARFCNs supported by each alternate cell under the target eNB.

In a fourth embodiment, for handovers, both the eNB and the UE calculate KeNB* using the EARFCN in the legacy part of signaling of the target cell instead of the one from the Mobility Control Info. According to this embodiment, a new information element in the RRCConnectionReconfiguration message for handover to indicate the DL EARFCN for the band in the legacy SIB1 signaling may be needed for the UEs which do not support the band signaled in the legacy part of SIB1. For re-establishment, the source eNB may provide the list of KeNB*s calculated for all possible DL EARFCNs supported by each alternate cell under the target eNB.

In a fifth embodiment, the source eNB is configured to provide the target eNB with the KeNB currently in use at the source eNB. This embodiment allows the target eNB to choose the band to be used at the target cell and to calculate the associated KeNB*, as well as to calculate the KeNB* for the alternate cells in the case of re-establishment. According to this embodiment, a new information element may be required in the RRC context or X2 layer to transfer the KeNB in use at the source eNB to target eNB.

FIG. 1 illustrates an example of an apparatus 10 according to an embodiment. In one embodiment, apparatus 10 may be an eNB, for example. It should be noted that one of ordinary skill in the art would understand that apparatus 10 may include components or features not shown in FIG. 1.

As illustrated in FIG. 1, apparatus 10 includes a processor 22 for processing information and executing instructions or operations. Processor 22 may be any type of general or specific purpose processor. While a single processor 22 is shown in FIG. 1, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be an eNB. In particular, in this embodiment, the eNB may be a source eNB having a source cell. In an embodiment, apparatus 10 may be controlled by memory 14 and processor 22, during X2 setup/reconfiguration, to receive the EARFCNs which the target cell supports. Apparatus 10 may be further controlled by memory 14 and processor 22 to decide to perform HO to the target cell which supports MFBI. Apparatus 10 may also be controlled by memory 14 and processor 22 to determine if the UE supports the DL EARFCN in the EUTRA-Mode-Info in the served cell information corresponding to the candidate handover target cell. If it does, apparatus 10 is controlled by memory 14 and processor 22 to create the KeNB*s for the target cell for HO and cells for reestablishment with the DL EARFCN in the EUTRA-Mode-Info.

If the UE does not support the DL EARFCN in the EUTRA-Mode-Info in the served cell information, then apparatus 10 may be controlled by memory 14 and processor 22 to determine if the UE supports the first FrequencyBandIndicator in the MultiBandInfoList in the served cell information corresponding to the candidate handover target cell. If the UE does support the first FrequencyBandIndicator, then apparatus 10 is controlled by memory 14 and processor 22 to create the KeNB*s for the target cell for HO and cells for reestablishment with the DL EARFCN belonging to the first FrequencyBandIndicator in the MultiBandInfoList and which maps to the physical frequency of the DL EARFCN in the EUTRA-Mode-Info in the served cell information. If, however, the UE does not support the first FrequencyBandIndicator in the MultiBandInfoList, then apparatus 10 is controlled by memory 14 and processor 22 to determine if the UE supports the second FrequencyBandIndicator in the MultiBandInfoList in the served cell information corresponding to the candidate handover target cell. If the UE does support the second FrequencyBandIndicator in the MultiBandInfoList, then apparatus 10 is controlled by memory 14 and processor 22 to create the KeNB*s for the target cell for HO and cells for reestablishment with the DL EARFCN belonging to the second FrequencyBandIndicator in the MultiBandInfoList and which maps to the physical frequency of the DL EARFCN in the EUTRA-Mode-Info in the served cell information. If the UE does not support the second FrequencyBandIndicator in the MultiBandInfoList, apparatus 10 is controlled to continue to look through the MultiBandInfoList to find a supported FrequencyBandIndicator. However, if no supported FrequencyBandIndicator is found in the MultiBandInfoList, then apparatus 10 determines that handover to the target cell is not possible and may be controlled to find another target cell for HO.

In another embodiment, apparatus 10 may be a target eNB in a target cell. In this embodiment, apparatus 10 is controlled by memory 14 and processor 22 to receive X2: HO request toward a cell which supports MFBI. Apparatus 10 may also be controlled by memory 14 and processor 22 to determine whether the UE supports freqBandIndicator in the SIB1 definition. (i.e, not a part of multi frequency band indicator). If the UE supports freqBandIndicator in the SIB1 definition, apparatus 10 may be controlled by memory 14 and processor 22 to create a RRCConnectionReconfiguration message for handover to UE with DL EARFCN, as the handover target, belonging to the freqBandIndicator in the SIB1 definition.

If the UE does not support the band in the freqBandIndicator in the SIB1 definition, apparatus 10 may be controlled by memory 14 and processor 22 to determine whether the UE supports the first freqBandIndicator in the multiBandInfoList in the SIB1. If it does, then apparatus 10 may be controlled by memory 14 and processor 22 to create a RRCConnectionReconfiguration message for handover to UE with DL EARFCN, as the handover target, belonging to the first frequency band in the multiBandInfoList in the SIB1. If the UE does not support the first freqBandIndicator in the multiBandInfoList, apparatus 10 may be controlled by memory 14 and processor 22 to determine whether the UE supports the second freqBandIndicator in the multiBandInfoList in the SIB1. If it does, then apparatus 10 may be controlled by memory 14 and processor 22 to create a RRCConnectionReconfiguration message for handover to UE with DL EARFCN, as the handover target, belonging to the second frequency band in the multiBandInfoList in the SIB1. If the UE does not support the second freqBandIndicator in the multiBandInfoList, apparatus 10 is controlled to continue to look through the multiBandInfoList to find a freqBandIndicator supported by UE. However, if no supported frequency band is found, then apparatus 10 determines that it is not suitable for handover and rejects the handover preparation.

Figure 2:
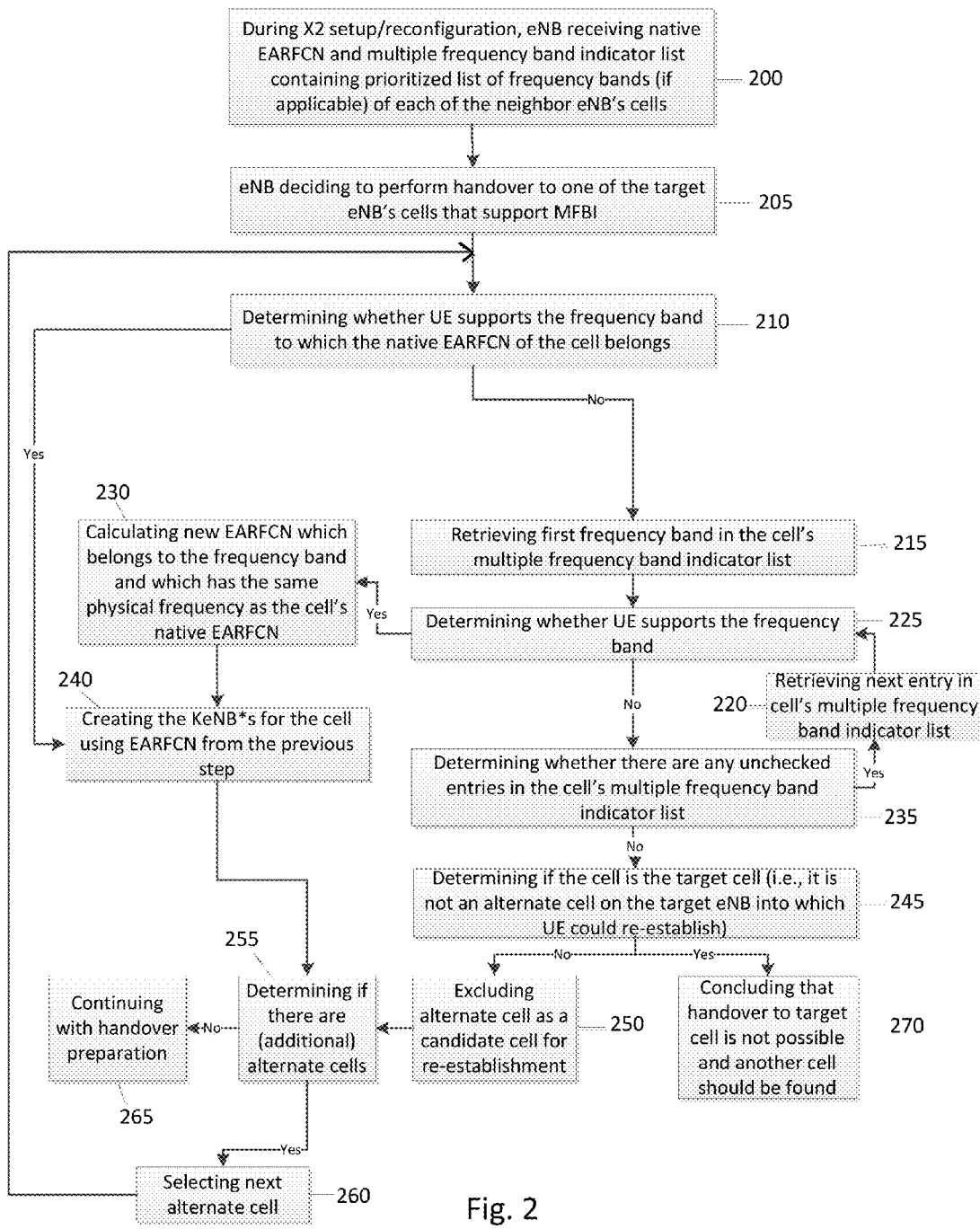
FIG. 2 illustrates a flow diagram of a method, according to one embodiment.

FIG. 2 illustrates an example of a flow diagram of a method, according to one embodiment. In an embodiment, the method of FIG. 2 may be performed by an eNB, such as a source eNB. The method may include, for instance during X2 setup/reconfiguration, at 200, receiving the native DL EARFCN and a multiple frequency band indicator list containing the additional frequency band(s) for each of the target eNB's cells (before the handover, the cells are just a neighbor cells). In an embodiment, the additional frequency bands supported by a neighbor cell may be listed in order of priority. The method may also include, at 205, deciding to perform HO to one of the target eNB's cells which supports MFBI.

The method may then include, at 210, determining if the UE supports the frequency band to which the native DL EARFCN of the candidate handover target cell belongs. If the UE supports the frequency band of the native DL EARFCN, the method may include, at 240, creating the KeNB*s for the target cell for HO with the native DL EARFCN. If the UE does not support the native DL EARFCN of the candidate handover target cell, then the method may include, at 215, retrieving the first frequency band in the target cell's multiple frequency band indicator list and, at 225, determining if the UE supports the first frequency band in the candidate handover target cell's multiple frequency band indicator list.

If the UE does support the first frequency band, then the method may proceed, at 230, by calculating a new DL EARFCN which belongs to the first frequency band and which has the same physical frequency as the target cell's native EARFCN, and, at 240, creating the KeNB*s for the target cell for HO with the new DL EARFCN. If, however, the UE does not support the first frequency band in the multiple frequency band indicator list, then the method may include, at 235, determining if the target cell supports any additional frequency bands and if so, at 220, retrieving the next additional frequency band from the candidate handover target cell's multiple frequency band indicator list, and proceed, at 225, to determine if the UE supports the additional frequency band. The method may then continue to determine if the UE supports any of the additional frequencies bands supported by the candidate handover target cell, and, if so, at 240, creating a KeNB* corresponding to the first supported additional frequency band found in the target cell's multiple frequency band indicator list.

If, at 245, it is determined that the cell is the target cell and no supported frequency band is found in the candidate handover target cell's multiple frequency band indicator list, then the method may include, at 270, determining that handover to the target cell is not possible and finding another target cell for HO. If, however, it is determined that the cell is not the target cell (i.e., it is an alternate cell), the method may include, at 250, excluding the alternate cell as a candidate for re-establishment.

If the UE is found to support the native EARFCN of the target cell or a frequency band in the target cell's multiple frequency band indicator list such that the KeNB* for the target cell can be calculated, then the method may include, at 255, determining if the target eNB has any alternate cells into which the UE could re-establish during the handover. If the target eNB does have alternate cells, the method may include, at 260, selecting the next alternate cell and then calculating the KeNB* for each alternate cell for which the UE supports based on either the alternate cell's native DL EARFCN or a frequency band in the alternate cell's multiple frequency band indicator list. If the target eNB does not have alternate cells or the KeNB* had been calculated for all alternate cells for which the UE supports either the alternate cell's native EARFCN or a frequency band in the alternate cell's multiple frequency band indicator list, the method may include, at 265, continuing with handover preparation.

Figure 3:
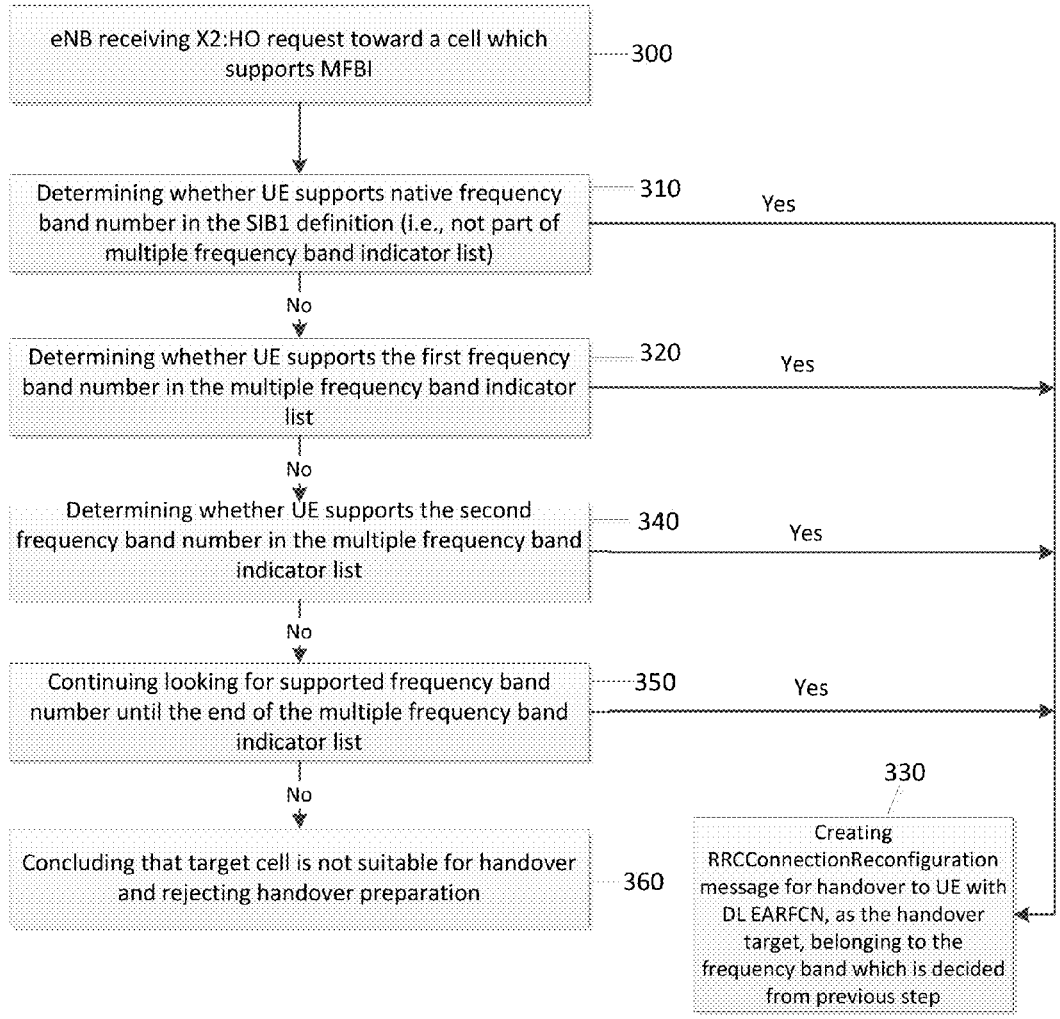
FIG. 3 illustrates a flow diagram of a method, according to another embodiment.

FIG. 3 illustrates an example of a flow diagram of a method, according to one embodiment. In an embodiment, the method of FIG. 3 may be performed by an eNB, such as a target eNB. The method may include, at 300, receiving X2: HO request toward a cell which supports MFBI. The method may then include, at 310, determining whether the UE supports native frequency band number in the SIB1 definition (i.e, not a part of multiple frequency band indicator list).

If the UE supports native frequency band number in the SIB1 definition, the method may include, at 330, creating a RRCConnectionReconfiguration message for handover to UE with DL EARFCN, as the handover target, belonging to the native frequency band number in the SIB1 definition. If the UE does not support the band in the native frequency band number in the SIB1 definition, the method may include, at 320, determining whether the UE supports the first frequency band number in the multiple frequency band indicator list in the SIB1. If it does, then the method may include, at 330, creating a RRCConnectionReconfiguration message for handover to UE with DL EARFCN, as the handover target, belonging to the first frequency band in the multiple frequency band indicator list in the SIB1. If the UE does not support the first frequency band number in the multiple frequency band indicator list, then the method may include, at 340, determining whether the UE supports the second frequency band number in the multiple frequency band indicator list in the SIB1. If it does, then the method may include, at 330, creating a RRCConnectionReconfiguration message for handover to UE with DL EARFCN, as the handover target, belonging to the second frequency band in the multiple frequency band indicator list in the SIB1. If the UE does not support the second frequency band number in the multiple frequency band indicator list, the method may include, at 350, continuing to look through the multiple frequency band indicator list to find a frequency band supported by UE. However, if no supported frequency band is found, then the method may include determining, at 360, that the target cell is not suitable for handover and rejecting the handover preparation.

In some embodiments, the functionality of any of the methods described herein, such as those illustrated in FIGS. 2 and 3 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:

receiving, by a source evolved node B (eNB) configured to communicate with a user equipment, a multiple frequency band indicator (MFBI) list, wherein the multiple frequency band indicator (MFBI) list comprises at least one frequency band number listed in a same order of priority as a target eNB broadcasts the downlink (DL) frequency bands in a system information block (SIB);

selecting one of the at least one frequency band number for use by the source eNB;

calculating a security key (KeNB*) using a downlink (DL) evolved universal terrestrial radio access absolute radio frequency channel number (EARFCN) belonging to the selected one of the at least one frequency band number with the highest priority that is also supported by the user equipment; and signaling the calculated security key to the target eNB.

2. The method according to claim 1, wherein the selecting further comprises selecting the one of the at least one frequency band number with a highest priority that is also supported by the user equipment.

3. The method according to claim 1, wherein the at least one frequency band number has a downlink (DL) evolved universal terrestrial radio access (EUTRA) absolute radio frequency channel number (EARFCN) which maps to the physical frequency of the target eNB.

4. The method according to claim 1, wherein the receiving comprises receiving the multiple frequency band indicator (MFBI) list during X2 setup or modification or X2 setup response.

5. The method according to claim 1, wherein the signaling further comprises signaling the calculated security key and the DL EARFCN belonging to the selected one of the at least one frequency band number to the target eNB during X2 handover.

6. The method according to claim 3, wherein the calculating further comprises calculating one or more security keys (KeNB*s) for all possible DL EARFCNs supported by each alternate cell under the target eNB.

7. The method according to claim 6, wherein the signaling further comprises transferring to the target eNB, via a new information element in radio resource control (RRC) context or X2 layer, the selected EARFCN and a list of the one or more security keys (KeNB*s) calculated for each of the alternate cells.

8. An apparatus, comprising:

at least one processor; and at least one memory including computer program code, wherein the at least one memory and the computer program code are configured, with the at least one processor, to cause the apparatus at least to receive a multiple frequency band indicator (MFBI) list, wherein the multiple frequency band indicator (MFBI) list comprises at least one frequency band number listed in a same order of priority as a target evolved node B (eNB) broadcasts DL frequency bands in a system information block (SIB);

select one of the at least one frequency band number for use by the apparatus;

calculate a security key (KeNB*) using a downlink (DL) evolved universal terrestrial radio access absolute radio frequency channel number (EARFCN) belonging to the selected one of the at least one frequency band number with a highest priority that is also supported by a user equipment; and signal the calculated security key to the target eNB.

9. The apparatus according to claim 8, wherein the apparatus comprises a source evolved node B (eNB).

10. The apparatus according to claim 8, wherein the at least one memory and the computer program code are further configured, with the at least one processor, to cause the apparatus at least to select the one of the at least one frequency band number with the highest priority that is also supported by the user equipment.

11. The apparatus according to claim 8, wherein the at least one frequency band number has a downlink (DL) evolved universal terrestrial radio access absolute radio frequency channel number (EARFCN) which maps to the physical frequency of the target eNB.

12. The apparatus according to claim 8, wherein the at least one memory and the computer program code are further configured, with the at least one processor, to cause the apparatus at least to receive the multiple frequency band indicator (MFBI) list during X2 setup or modification or X2 setup response.

13. The apparatus according to claim 8, wherein the at least one memory and the computer program code are further configured, with the at least one processor, to cause the apparatus at least to signal the calculated security key and the DL EARFCN belonging to the selected one of the at least one frequency band number to the target eNB during X2 handover.

14. The apparatus according to claim 11, wherein the at least one memory and the computer program code are further configured, with the at least one processor, to cause the apparatus at least to calculate one or more security keys (KeNB*s) for all possible downlink (DL) evolved universal terrestrial radio access absolute radio frequency channel numbers (EARFCNs) supported by each alternate cell under the target eNB.

15. The apparatus according to claim 14, wherein the at least one memory and the computer program code are further configured, with the at least one processor, to cause the apparatus at least to transfer to the target eNB, via a new information element in radio resource control (RRC) context or X2 layer, the selected EARFCN and a list of the one or more security keys (KeNB*s) calculated for each of the alternate cells.

16. A computer program, embodied on a non-transitory computer readable medium, wherein the computer program is configured to control a processor to perform a process, comprising:
   receiving, by a source evolved node B (eNB) configured to communicate with a user equipment, a multiple frequency band indicator (MFBI) list, wherein the multiple frequency band indicator (MFBI) list comprises at least one frequency band number listed in a same order of priority as a target eNB broadcasts the DL frequency bands in a system information block (SIB);
   selecting one of the at least one frequency band number for use by the source eNB;
   calculating a security key (KeNB*) using a downlink (DL) evolved universal terrestrial radio access absolute radio frequency channel number (EARFCN) belonging to the selected one of the at least one frequency band number with a highest priority that is also supported by the user equipment; and
   signaling the calculated security key to the target eNB.

* * * * *